United States Patent [19]

Cao et al.

[11] Patent Number: 5,311,431
[45] Date of Patent: May 10, 1994

[54] METHOD OF OBTAINING THE YAWING VELOCITY AND/OR TRANSVERSE VELOCITY OF A VEHICLE

[75] Inventors: Chi-Thuan Cao, Korntal-Münchingen; Thorsten Bertram, Düsseldorf, both of Fed. Rep. of Germany

[73] Assignee: Robert Bosch GmbH, Stuttgart, Fed. Rep. of Germany

[21] Appl. No.: 906,292

[22] Filed: Jul. 1, 1992

[30] Foreign Application Priority Data

Jul. 3, 1991 [DE] Fed. Rep. of Germany ....... 4121954

[51] Int. Cl.[5] ............................................. B62D 6/00
[52] U.S. Cl. ............................ 364/424.05; 364/565; 180/142
[58] Field of Search ................... 364/565, 566, 424.05, 364/426.02, 426.03; 180/79.1, 140–142, 197; 280/91; 303/95, 100, 103

[56] References Cited

U.S. PATENT DOCUMENTS

| | | |
|---|---|---|
| 4,679,808 | 7/1987 | Ito et al. .............................. 280/91 |
| 4,706,771 | 11/1987 | Kawabe et al. ............... 364/424.05 |
| 4,872,116 | 10/1989 | Ito et al. ......................... 364/424.05 |
| 4,878,557 | 11/1989 | Shibahata et al. ............ 364/424.05 |
| 5,001,636 | 3/1991 | Shiraishi et al. .............. 364/424.05 |
| 5,001,637 | 3/1991 | Shiraishi et al. .................... 180/142 |
| 5,047,939 | 9/1991 | Ito et al. .............................. 180/142 |
| 5,136,507 | 8/1992 | Shiraishi et al. .................... 180/142 |

*Primary Examiner*—Gary Chin
*Attorney, Agent, or Firm*—Spencer, Frank & Schneider

[57] ABSTRACT

A method for obtaining the yawing velocity $\omega$ and the transverse velocity $v_y$ of a vehicle so that these values can be employed, for example, in regulating the vehicle system, with the values being determined with the aid of simple sensors. Measured values are obtained for the transverse acceleration $a_y$ and the steering angles $\delta$ of the two axles, and the yawing velocity $\omega$ and the vehicle's transverse velocity $v_y$ are estimated therefrom in a state estimator.

9 Claims, 2 Drawing Sheets

METHOD OF OBTAINING THE YAWING VELOCITY AND/OR TRANSVERSE VELOCITY OF A VEHICLE

REFERENCE TO RELATED APPLICATIONS

This application claims the priority of Federal Republic of Germany application Ser. No. P 41 21 954.6 filed Jul. 3rd, 1991, which is incorporated herein by reference.

BACKGROUND OF THE INVENTION

The present invention relates to a method of obtaining the yawing velocity $\omega$ and/or the transverse velocity $v_y$ of a vehicle, or a vehicle value that is a function of the yawing velocity and/or the transverse velocity of the vehicle, in order to control a system of the vehicle.

A robust model servo-control based on the state variables of transverse and yawing velocity may be considered as a concept for the provision of a controlled rear-wheel drive system, see for example, German Unexamined Published Patent Application DE-OS 4,030,846.

Although there exist notechnical limits for measuring the yawing velocity with the aid of a stabilizing gyro, a rate sensor or a fiberoptic gyro, and measuring the transverse velocity with the use of optical correlation methods, the use of appropriate sensors and the information processing systems required for the measuring signals go beyond the economical framework of, for example, a controlled rear-wheel drive system.

One possibility for determining the difficultly measurable state values is the use of a state estimator such as a "Kalman filter". However, a vehicle is characterized by great non-linearities and variable parameters, e.g. position of center of gravity, lateral rigidities of the tires, vehicle speed, etc. Consequently, a corresponding non-linear Kalman filter quickly exceeds the computing capabilities of a vehicle computer.

SUMMARY OF THE INVENTION

It is therefore an object of the present invention to provide a method of continuously determining the relevant vehicle motion values with a minimum number of sensors, which are either economical or are provided in the vehicle in any case, and by the use of an on-line method that can be realized by engineering measures.

The above object is generally achieved by an improved method for controlling a motor driven wheeled vehicle having front and rear axles and including the steps of obtaining values for at least one of the yawing velocity $\omega$ and the transverse velocity $v_y$ of the vehicle, and using the obtained value for the yawing velocity $\omega$ and the transverse velocity $v_y$ to control a driving dynamic of the vehicle. According to the invention, the step of obtaining values for the yawing velocity $\omega$ and/or the transverse velocity $v_y$ comprises: measuring and providing signals corresponding to the transverse acceleration $a_y$, the front wheel drive angle $\delta_v$, and the rear-wheel drive angle $\delta_h$ (if provided) of the vehicle; forming a data vector
$$m^r(k-1)=[a_y(k-2)a_y(k-3)|\delta_v(k-1)\delta_v(k-3)|\delta_h(k-1)\delta_h(k-2)\delta_h(k-3)]^r$$
from the three measured values $a_y$, $\delta_v$ and $\delta_h$, with k, (k−1), etc., representing times of measurements;

multiplying the data vector $m^r(k-1)$ with the estimated value of a parameter vector $\hat{p}(k-1)$ to determine an estimated value for the transverse acceleration $\hat{a}_y(k)$;

recursively calculating the estimated value of a parameter with $\hat{p}(k)$ with the aid of an estimation algorithm from the previously determined estimated value $\hat{p}(k-1)$ and an error value $e(k)=a_y(k)-\hat{a}_y(k)$; and multiplying the matrix $M^*(k-1)$ of the data vector $m^r(k-1)$ with the matrix $\hat{p}^*(k)$ of the parameter vector $\hat{p}(k)$ to determine a state vector $\hat{x}(k)=[\omega(k) v_y(k)]$ and thus provide the yawing velocity $\omega(k)$ and the transverse velocity $v_y(k)$ of the vehicle.

The method according to the invention can also be employed if additionally only one or several of the following values are required:
$\beta$ side slip angle error;
$\alpha_v$ slip angle, front;
$\alpha_h$ slip angle, rear;
$F_{yv}$ lateral stability force, front; and
$F_{yh}$ lateral stability force, rear.

In such case the desired one or more of these vehicle values is determined using the already determined yawing and/or transverse velocity.

The method according to the invention can also be employed if no rear-wheel drive system is provided, that is, if $\delta=0$ can be set.

One embodiment of the invention will be described below with reference to the drawing figures.

DETAILED DESCRIPTION OF THE PREFERRED EMBODIMENT

Figure 1:
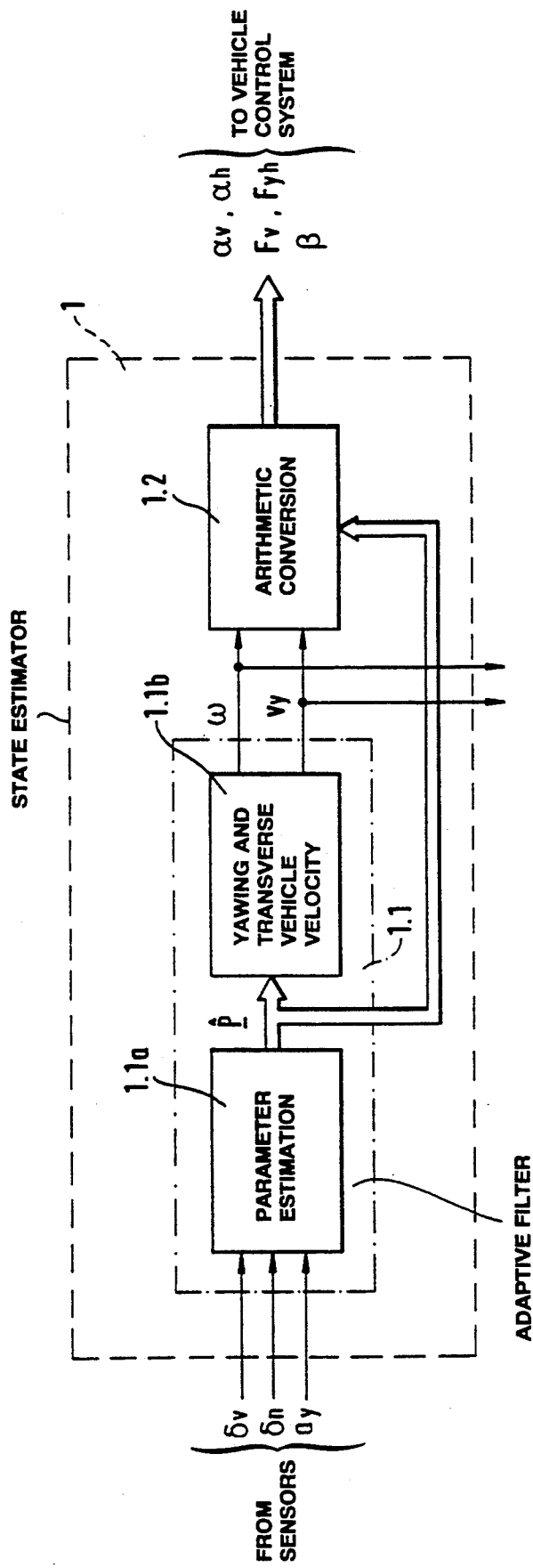
FIG. 1 is a basic block circuit diagram for implementing the method according to the invention.

In FIG. 1, the sensor signals from known sensors are employed to measure:
the front steering angle $\delta_v$;
the rear steering angle $\delta_h$; and
the transverse acceleration $a_y$ at the center of gravity of the vehicle.

Signals corresponding to these measured values are fed to a state estimator 1 in order to determine the motion values for
the yawing velocity $\omega$, and
the transverse vehicle velocity $v_y$.

State estimator 1 is composed of two parts:
Block 1.1 which inlcudes an adaptive filter and is comprised of two subblocks 1.1a and 1.1b; and
Block 1.2 which includes an arithmetric conversion.

In subblock 1.1a a parameter estimation algorithm, e.g., stochastic approximation, least squares, etc., is initially employed to estimate several parameters p. From this parameter vector, the two values $\omega$ and $v_y$ can be reconstructed in subblock 1.1b.

The other motion values $\beta$, $\alpha_v$, $\alpha_h$, $F_{yv}$, $F_{yh}$ defined above can be derived from these state values by simple arithmetic recalculations in block 1.2.

The thus obtained motion values can be employed, for example, directly for the following driving dynamics controls:
active four-wheel drive;
ABS/ACS (anti-lock brake system/anti-slip control); and
active vehicle control with adjustable damping.

Figure 2:
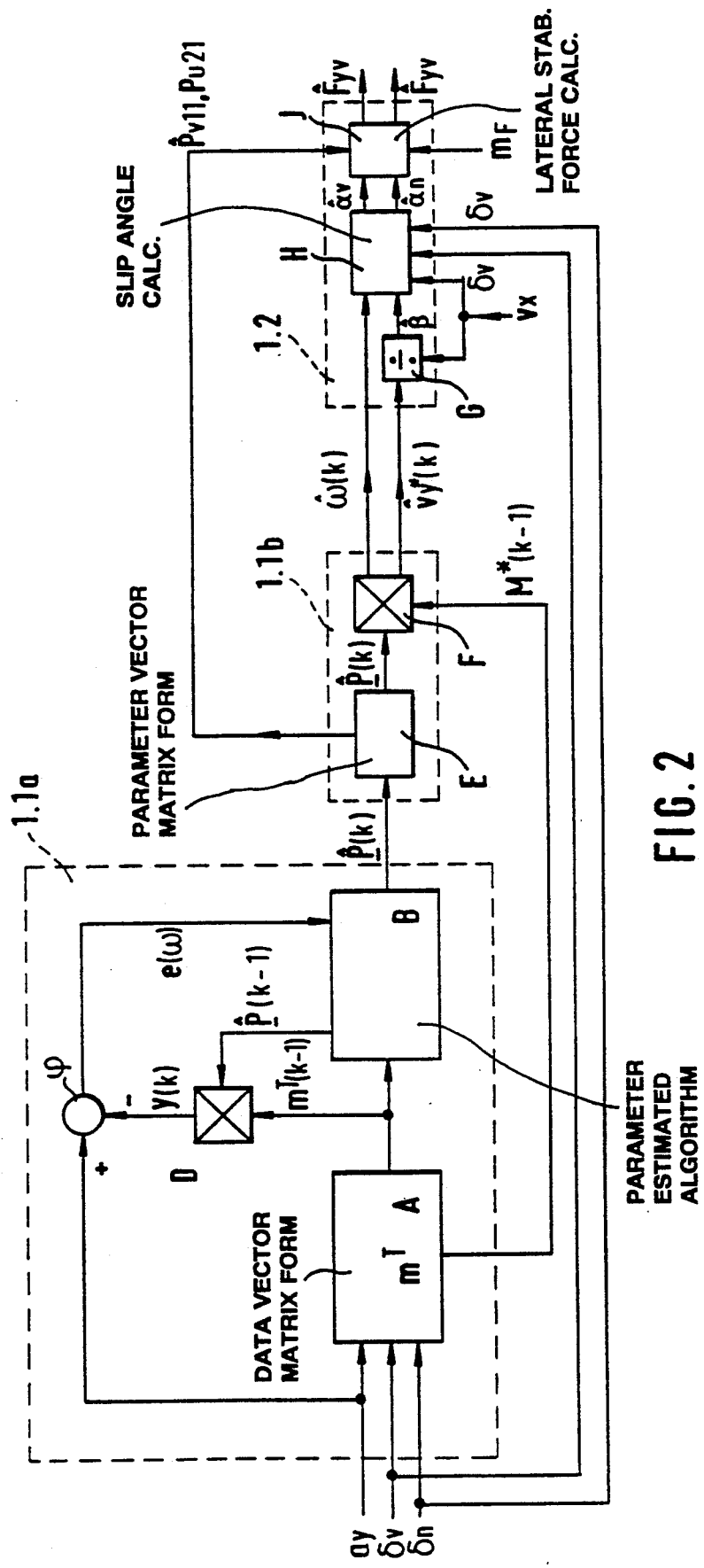
FIG. 2 is a detailed block circuit diagram for carrying out the method according to the invention.

The method according to the invention will now be described in greater detail with reference to FIG. 2. For the following description of the method, the following basic equation is assumed to apply:

$$a_y(k) = [a_y(k-2)a_y(k-3)|\delta_v(k-1)\delta_v(k-2)\delta_v(k-$$

$$3)|\delta_h(k-1)\delta_h(k-2)\delta_h(k-3)] \cdot \begin{bmatrix} p_{y1} \\ p_{y2} \\ p_{u11} \\ p_{u12} \\ p_{u13} \\ p_{u21} \\ p_{u22} \\ p_{u23} \end{bmatrix}$$

From the measured values $a_y$, $\delta_v$ and $\delta_h$, data vector $m(k-1)$ is formed in Block A as follows:

$$m(k-1)=[a_y(k-2)a_y(k-3)|\delta_v(k-1)\delta_v(k-2)\delta_v(k-3)|\delta_h(k-1)\delta_h(k-2)\delta_h(k-3)]^T$$

In a parameter estimation algorithm block B, a parameter vector $\hat{p}(k)$ is calculated recursively with the aid of an estimation algorithm as follows:

$$\hat{p}(k) = \hat{p}(k-1) + r(k) \cdot e(k)$$

This can be expressed as follows:

$$p = [p_{y1}\ p_{y2}|p_{u11}\ p_{u12}\ p_{u13}|p_{u21}\ p_{u22}\ p_{u23}]^T$$

and is available in Block E.

The value $e(k)$ is obtained in difference former C as follows:

$$e(k) = a_y(k) - \hat{y}(k) = m^r(k-1) \cdot \hat{p}(k-1)$$

For this purpose $\hat{p}(k-1)$ is first multiplied in Block D with the data vector $m^r(k-1)$. With a stochastic approximation, $r(k)$ is selected to be, for example, the following:

$$r(k) = \frac{1}{1 + m^T(k-1) \cdot m(k-1)} \cdot m(k-1)$$

The state vector including the values $$x = [\omega, V_y]^T$$

to be determined is then obtained in the multiplier F as follows:

$\hat{x}(k) = M^*(k-1) \cdot \hat{p}^*(k)$, where $M^*(k-1)$ and $\hat{p}^*(k)$ are matrixes which can be read from the data vector $m^r(k-1)$ and the parameter vector $\hat{p}(k)$, respectively. These matrixes are as follows:

$$M^*(k-1) = \begin{bmatrix} a_y(k-1) & a_y(k-2)| & \delta_v(k-1) & \delta_v(k-2)| & \delta_h(k-1) & \delta_h(k-2) \\ 0 & a_y(k-1)| & 0 & \delta_v(k-2)| & 0 & \delta_h(k-1) \end{bmatrix}$$

$$\hat{p}(k) = [\hat{p}_{y1}(k)\hat{p}_{y2}(k)\ |\hat{p}_{u12}(k)\hat{p}_{u13}(k)\ |\hat{p}_{u22}(k)\hat{p}_{u23}(k)]$$

This matrix multiplication in multiplier box F provides the values $\omega$ and $v_y$ for the yawing velocity and the transverse velocity, respectively.

From the values of $\omega$ and $v_y$, the following further motion values can be derived:

1- the side slip angle $$\beta(k) = \frac{\hat{v}_y(k)}{v_x}$$

where $v_x$ is the measured vehicle speed in divider Block G;

2 - the front slip angle $$\hat{a}_v(k) = \frac{\hat{v}_y(k) + l_v\omega(k)}{v_x} - \delta_v$$

where $l_v$ is the known distance between the vehicle center of gravity and front axle in block H;

3 - the rear slip angle $$\hat{a}_H(1k) = \frac{\hat{v}_y(k) - l_h\hat{\omega}(k)}{v_x} - \delta_h$$

where $l_h$ is the known distance between the vehicle center of gravity and rear axle in Block H; and 4 - the front lateral stability force and the rear lateral stability force $$\left. \begin{aligned} \hat{F}_{yv} &= \frac{m_F \cdot \hat{P}_{u11}}{2} \cdot \hat{a}_v(k) \\ \hat{F}_{yh} &= \frac{m_F \cdot \hat{P}_{u21}}{2} \cdot \hat{a}_H(k) \end{aligned} \right\}$$

where $m_F$ is the vehicle mass in Block I.

The derived motion values are then fed to the vehicle control system to control the vehicle in a known manner, e.g. as in the above-mentioned German published patent application.

The invention now being fully described, it will be apparent to one of ordinary skill in the art that any changes and modifications can be made thereto without departing from the spirit or scope of the invention as set forth herein.

What is claimed:

1. In a method of controlling a motor driven wheeled vehicle having front and rear axles and including the steps of obtaining values for at least one of the yawing velocity $\omega$ and the transverse velocity $v_y$ of the vehicle, and using the obtained values for at least one of the yawing velocity $\omega$ and the transverse velocity $v_y$ to control a driving dynamic of the vehicle; the improvement wherein said step of obtaining comprises:

measuring and providing signals corresponding to the transverse acceleration $a_y$, the front wheel drive angle $\delta_v$, and any rear-wheel drive angle $\delta_h$ of the vehicle;

forming a data vector $$m^r(k-1)=[a_y(k-2)a_y(k-3)|\delta_v(k-1)\delta_v(k-2)\delta_v(k-3)|\delta_h(k-1)\delta_h(k-2)\delta_h(k-3)]^r$$

from the three measured values $a_y$, $\delta_v$ and $\delta_h$, with k, $(k-1)$, $(k-2)$, and $(k-3)$ representing times of measurements;

multiplying the data vector $m^r(k-1)$ with the estimated value of a parameter vector $\hat{p}(k-1)$ to determine an estimated value for the transverse acceleration $\hat{a}_y(k)$;

recursively calculating the estimated value of a parameter vector $\hat{p}(k)$ using an estimation algorithm from the previously determined estimated value $\hat{p}(k-1)$ and an error value $e(k) = a_y(k) - \hat{a}_y(k)$;

multiplying the matrix $M^*(k-1)$ of the data vector $m^r(k-1)$ with the matrix $\hat{p}^*(k)$ of the parameter vector $\hat{p}(k)$ to determine a state vector $\hat{x}(k)=[\omega(k)\ v_y(k)]$; and, determining at least one of the yawing velocity $\omega(k)$ and the transverse velocity $v_y(k)$ of the vehicle from the state vector.

2. A method according to claim 1, wherein said step of calculating the estimated value of the parameter vector $\hat{p}(k)$ includes obtaining the estimated value of the parameter vector by the following equation:

$$\hat{p}(k) = \hat{p}(k-1) + r(k) \cdot e(k)$$

where, with a stochastic approximation, $r(k)$ is selected as follows:

$$r(k) = \frac{1}{1 + m^T(k-1) \cdot m(k-1)} \cdot m(k-1)$$

3. A method according to claim 2, wherein said step of using includes measuring the longitudinal velocity $v_x$ of the vehicle, and determining the side slip angle $\beta = \hat{v}_y/v_x$ of the vehicle from the determined transverse velocity $\hat{v}_y$ and the measured longitudinal velocity $v_x$.

4. A method according to claim 3, wherein said step of using further includes calculating the slip angles $\alpha_v$ and $\alpha_h$ of the respective front and rear axles according to the following equations:

$$\hat{\alpha}_v(k) = \frac{\hat{v}_y(k) + l_v\hat{\omega}(k)}{v_x} - \delta_v$$

and $$\hat{\alpha}_h(k) = \frac{\hat{v}_y(k) - l_h\hat{\omega}(k)}{v_x} - \delta_h$$

where $l_v$ and $l_h$ are the respective distances of the front and rear axles from the center of gravity of the vehicle.

5. A method according to claim 4, wherein said step of using further includes determining the lateral stability forces $F_{yv}$ and $F_{yh}$, of the wheels of the respective front and rear axles according to the following equations:

$$\hat{F}_{yv}(k) = -\frac{m_F \hat{p}_{u11}}{1} \cdot \hat{\alpha}_v(k)$$

and $$\hat{F}_{yH}(k) = -\frac{m_F \hat{p}_{u21}}{2} \hat{\alpha}_h(k)$$

where $m_f$ is the vehicle mass, $\hat{p}_{u11}$ and $\hat{p}_{u21}$ are the associated terms of the matrix of the parameter vector, and $\alpha_v(k)$ and $\alpha_h(k)$ are the slip angles associated with the respective front and rear axles.

6. A method according to claim 1, wherein said step of using includes measuring the longitudinal velocity $v_x$ of the vehicle, and determining the side slip angle $\beta = \hat{v}_y/v_x$ of the vehicle from the determined transverse velocity $\hat{v}_y$ and the measured longitudinal velocity $v_x$.

7. A method according to claim 6, wherein said step of using further includes: measuring the longitudinal velocity $v_x$ of the vehicle, and calculating the slip angles $\alpha_v$ and $\alpha_h$ of the respective front and rear axles according to the following equations:

$$\hat{\alpha}_v(k) = \frac{\hat{v}_y(k) + l_v\hat{\omega}(k)}{v_x} - \delta_v$$

and $$\alpha_H(k) = \frac{\hat{v}_y(k) - l_h\hat{\omega}(k)}{v_x} - \delta_h$$

where $l_v$ and $l_h$ are the respective distances of the front and rear axles from the center of gravity of the vehicle.

8. A method according to claim 1, wherein said step of using further includes calculating the slip angles $\alpha_v$ and $\alpha_h$ of the respective front and rear axles according to the following equations:

$$\hat{\alpha}_v(k) = \frac{\hat{v}_y(k) + l_v\hat{\omega}(k)}{v_x} - \delta_v$$

and $$\alpha_H(k) = \frac{\hat{v}_y(k) - l_h\hat{\omega}(k)}{v_x} - \delta_h$$

where $v_x$ is the longitudinal velocity of the vehicle, and $l_v$ and $l_h$ are the respective distances of the front and rear axles from the center of gravity of the vehicle.

9. A method according to claim 8, wherein said step of using further includes: determining the lateral stability forces $F_{yv}$ and $F_{yh}$, of the wheels of the respective front and rear axles according to the following equations:

$$\hat{F}_{yv}(k) = -\frac{m_F \hat{p}_{u11}}{1} \cdot \hat{\alpha}_v(k)$$

and $$\hat{F}_{yH}(k) = -\frac{m_F \hat{p}_{u21}}{2} \hat{\alpha}_H(k)$$

where $m_f$ is the vehicle mass, $\hat{p}_{u11}$ and $\hat{p}_{u21}$ are the associated terms of the matrix of the parameter vector, and $\alpha_v(k)$ and $\alpha_h(k)$ are the slip angles associated with the respective front and rear axles.

* * * * *